United States Patent
Lin et al.

(10) Patent No.: US 11,748,934 B2
(45) Date of Patent: Sep. 5, 2023

(54) THREE-DIMENSIONAL EXPRESSION BASE GENERATION METHOD AND APPARATUS, SPEECH INTERACTION METHOD AND APPARATUS, AND MEDIUM

(71) Applicant: Tencent Technology (Shenzhen) Company Limited, Shenzhen (CN)

(72) Inventors: Xiangkai Lin, Shenzhen (CN); Linchao Bao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 124 days.

(21) Appl. No.: 17/503,178

(22) Filed: Oct. 15, 2021

(65) Prior Publication Data
US 2022/0036636 A1    Feb. 3, 2022

Related U.S. Application Data

(63) Continuation of application No. PCT/CN2020/115882, filed on Sep. 17, 2020.

(30) Foreign Application Priority Data

Nov. 15, 2019  (CN) .......................... 201911120979.5

(51) Int. Cl.
*G06T 15/04* (2011.01)
*G06T 7/55* (2017.01)
(Continued)

(52) U.S. Cl.
CPC ............... *G06T 15/04* (2013.01); *G06T 5/50* (2013.01); *G06T 7/33* (2017.01); *G06T 7/55* (2017.01);
(Continued)

(58) Field of Classification Search
None
See application file for complete search history.

(56) References Cited

U.S. PATENT DOCUMENTS 8,254,647 B1 * 8/2012 Nechyba .............. G06V 40/165
382/118
10,055,880 B2    8/2018 Yan et al.
(Continued)

FOREIGN PATENT DOCUMENTS

CN    108154550 A    6/2018
CN    109035388 A    12/2018
(Continued)

OTHER PUBLICATIONS

Tencent Technology, ISR, PCT/CN2020/115882, Dec. 3, 2020, 3 pgs.
(Continued)

*Primary Examiner* — Frank S Chen
(74) *Attorney, Agent, or Firm* — Morgan, Lewis & Bockius LLP

(57) ABSTRACT

This application provides a three-dimensional (3D) expression base generation method performed by a computer device. The method includes: obtaining image pairs of a target object in n types of head postures, each image pair including a color feature image and a depth image in a head posture; constructing a 3D human face model of the target object according to then image pairs; and generating a set of expression bases of the target object according to the 3D human face model of the target object. According to this application, based on a reconstructed 3D human face model, a set of expression bases of a target object is further generated, so that more diversified product functions may be expanded based on the set of expression bases.

20 Claims, 9 Drawing Sheets

(51) Int. Cl.
*G06T 7/33* (2017.01)
*G06T 7/70* (2017.01)
*G06V 40/16* (2022.01)
*G06T 5/50* (2006.01)
*G06T 13/20* (2011.01)
*G06T 17/00* (2006.01)

(52) U.S. Cl.
CPC .............. *G06T 7/70* (2017.01); *G06T 13/205* (2013.01); *G06T 17/00* (2013.01); *G06V 40/171* (2022.01); *G06T 2207/10024* (2013.01); *G06T 2207/10028* (2013.01); *G06T 2207/20221* (2013.01); *G06T 2207/30201* (2013.01); *G06T 2219/2004* (2013.01)

(56) References Cited

U.S. PATENT DOCUMENTS

2020/0105013 A1\* 4/2020 Chen .................... G06V 40/166
2022/0292751 A1\* 9/2022 Kimura .................... G06T 7/00

FOREIGN PATENT DOCUMENTS

| | | |
|---|---|---|
| CN | 109377544 A | 2/2019 |
| CN | 109949412 A | 6/2019 |
| CN | 110096925 A | 8/2019 |
| CN | 110163054 A | 8/2019 |
| CN | 110163939 A | 8/2019 |
| CN | 111028330 A | 4/2020 |
| KR | 20130098824 A | 9/2013 |

OTHER PUBLICATIONS

Tencent Technology, WO, PCT/CN2020/115882, Dec. 3, 2020, 5 pgs.
Tencent Technology, IPRP, PCT/CN2020/115882, May 17, 2022, 6 pgs.
Darren Cosker et al., "Perception of Linear and Nonlinear Motion Properties Using a FACS Validated 3D Facial Model", Applied Perception in Graphics and Visualization, ACM, New York, NY, Jul. 23, 2010, XP058131195, 8 pgs.
Tencent Technology, Extended European Search Report and Supplementary Search Report, EP20887575.7, dated Apr. 3, 2023, 12 pgs.

\* cited by examiner

*THREE-DIMENSIONAL EXPRESSION BASE GENERATION METHOD AND APPARATUS, SPEECH INTERACTION METHOD AND APPARATUS, AND MEDIUM*

CROSS-REFERENCE TO RELATED APPLICATIONS

This application is a continuation application of PCT Patent Application No. PCT/CN2020/115882, entitled "METHOD FOR GENERATING 3D EXPRESSION BASE, VOICE INTERACTIVE METHOD, APPARATUS AND MEDIUM" filed on Sep. 17, 2020, which claims priority to Chinese Patent Application No. 201911120979.5, filed with the State Intellectual Property Office of the People's Republic of China on Nov. 15, 2019, and entitled "THREE-DIMENSIONAL EXPRESSION BASE GENERATION METHOD AND APPARATUS, DEVICE, AND STORAGE MEDIUM", all of which are incorporated herein by reference in their entirety.

FIELD OF THE TECHNOLOGY

Embodiments of this application relate to the field of computer vision (CV) technologies, and in particular, to a three-dimensional (3D) expression base generation method and apparatus, a speech-expression interaction method and apparatus, and a medium.

BACKGROUND OF THE DISCLOSURE 3D human face reconstruction is to reconstruct a 3D model of a human face from one or more two-dimensional (2D) images.

In the related art, one or more human face images of a target object are obtained through photographing, and these human face images are analyzed for extracting some pieces of key information, and then a 3D human face model of the target object is reconstructed based on the key information.

However, the 3D human face model reconstructed in the related art is a static model with limited implementable functions.

SUMMARY

Embodiments of this application provide a 3D expression base generation method and apparatus, a speech-expression interaction method and apparatus, and a medium, which may be used to resolve a technical problem that a human face reconstruction solution provided in the related art has limited implementable functions. Based on a reconstructed 3D human face model, a set of expression bases of a target object is further generated, so that more diversified product functions may be expanded based on the set of expression bases. The technical solutions are as follows:

According to an aspect, an embodiment of this application provides a 3D expression base generation method performed by a computer device, the method including:

obtaining n sets of image pairs of a target object inn types of head postures, the n sets of image pairs including color feature images and depth images in the n types of head postures, an $i^{th}$ head posture being corresponding to an $i^{th}$ set of image pair, n being a positive integer, 0<i≤n;

constructing a 3D human face model of the target object according to the n sets of image pairs; and generating an expression base corresponding to the target object based on the 3D human face model.

According to another aspect, an embodiment of this application provides a speech-expression interaction method, performed by a computer device, the method including:

determining an expression sequence corresponding to speech information to be played, the expression sequence comprising at least one expression;

generating 3D human face models of the target object using the expression base corresponding to the target object and the expression sequence corresponding to the speech information; and displaying the 3D human face models in turn according to a sequence of the at least one expression in the expression sequence in a process of playing the speech information.

According to still another aspect, an embodiment of this application provides a computer device, including a processor and a memory, the memory storing at least one instruction, at least one program, a code set, or an instruction set, the at least one instruction, the at least one program, the code set, or the instruction set being loaded and executed by the processor to implement the 3D expression base generation method or the speech-expression interaction method.

In some embodiments, the computer device is a terminal or a server.

According to still another aspect, an embodiment of this application provides a non-transitory computer-readable storage medium, storing at least one instruction, at least one program, a code set, or an instruction set, the at least one instruction, the at least one program, the code set, or the instruction set being loaded and executed by a processor to implement the 3D expression base generation method.

According to still another aspect, an embodiment of this application provides a non-transitory computer-readable storage medium, storing at least one instruction, at least one program, a code set, or an instruction set, the at least one instruction, the at least one program, the code set, or the instruction set being loaded and executed by a processor to implement the speech-expression interaction method.

The technical solutions provided in the embodiments of this application may include the following beneficial effects:

An image pair of a target object in at least one head posture is obtained, a 3D human face model of the target object is constructed based on the image pair, and a set of expression bases of the target object is generated based on the 3D human face model, so that more diversified product functions may be expended based on the set of expression bases. In addition, the set of expression bases generated by using the technical solutions in this application is a set of high-precision (that is, similar in appearance to the target object) and drivable expression bases, which can generate a 3D human face model of the target object in any expression.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
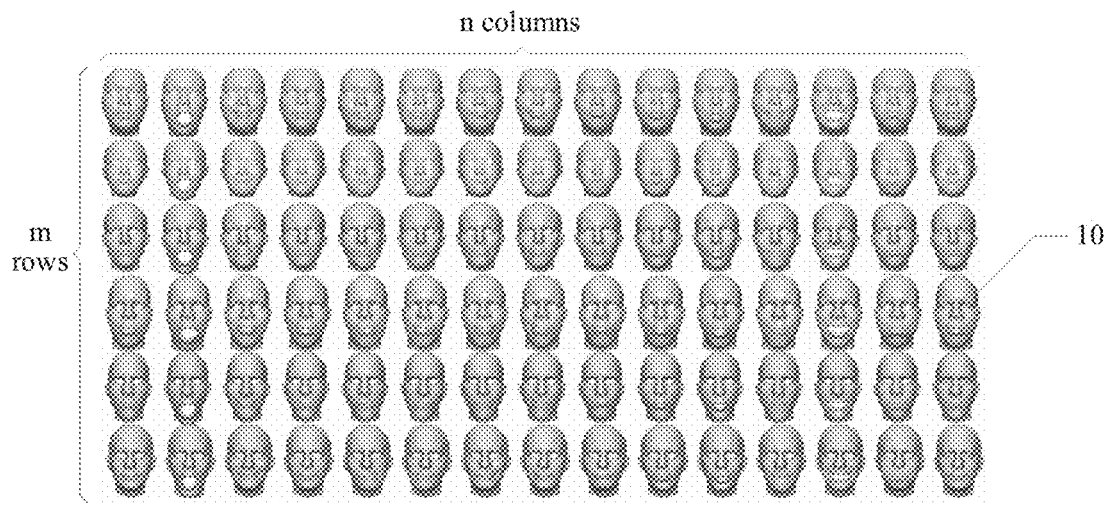
FIG. 1 is a schematic diagram of a bilinear 3D morphable model (3DMM) library according to an embodiment of this application.

To make objectives, technical solutions, and advantages of this application clearer, the following further describes implementations of this application in detail with reference to the accompanying drawings.

Artificial intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology of computer sciences, attempts to understand essence of intelligence, and produces a new intelligent machine that can react in a manner similar to human intelligence. AI is to study design principles and implementation methods of various intelligent machines, to enable the machines to have functions of perception, reasoning, and decision-making.

The AI technology is a comprehensive discipline and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing (NLP) technology, and machine learning (ML)/deep learning (DL).

The CV technology is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multidimensional data. The CV technology generally includes technologies such as image processing, image recognition, image semantic understanding, image retrieval, optical character recognition (OCR), video processing, video semantic understanding, video content/behavior recognition, three-dimensional object reconstruction, a 3D technology, virtual reality (VR), augmented reality (AR), synchronous positioning, and map construction, and further include biological feature recognition technologies such as common face recognition and fingerprint recognition.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of this application relates to the field of 3D human face reconstruction technologies. A human face image of a target object is analyzed by using the CV technologies to construct a 3D human face model of the target object, and a set of expression bases of the target object is generated based on the 3D human face model.

A 3DMM library includes two parts of expression bases and shape bases, and may be linear or bilinear. FIG. 1 is a schematic diagram of a typical bilinear 3DMM library 10. Each row is the same person, and there are m people, so that there are m rows (m different shapes). Columns in the rows correspond to different expressions, and there are n expressions, so that there are n columns.

Referring to the 3DMM library shown in FIG. 1, a human face in any shape with any expression may be parameterized for representation by using the 3DMM library. Formula 1 as follows:

$$M = \exp \times Cr \times id \quad \text{(Formula 1)}$$

where Cr is a 3DMM library, a dimension is n×k×m, k is a quantity of point clouds of a single human face, n is a quantity of expressions, m is a quantity of shape bases (or referred to as "face-to-parameter translation"), exp is an expression coefficient, a dimension is 1×n, id is a shape coefficient, a dimension is m×1, n, m, k are all positive integers.

Figure 2:
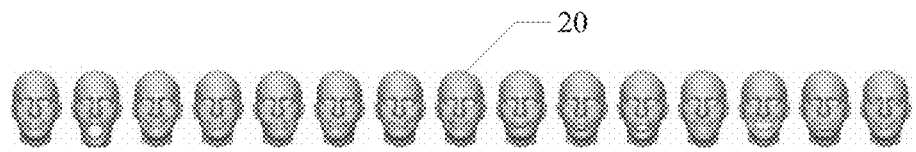
FIG. 2 is a flowchart of a set of expression bases according to an embodiment of this application.

It may be seen from the formula 1 that, any human face may be parameterized as id+exp for representation. An id of the person is fixed, and is used for representing an identifier corresponding to the person. As shown in FIG. 2, a set of expression bases specific to the person can be exported by using the id. Apparently, when there is such a set of expression bases 20 of the person, a human face expression may be driven by using an expression coefficient, and a 3D human face model of the person in any expression may be generated by transforming the expression coefficient.

Figure 3:
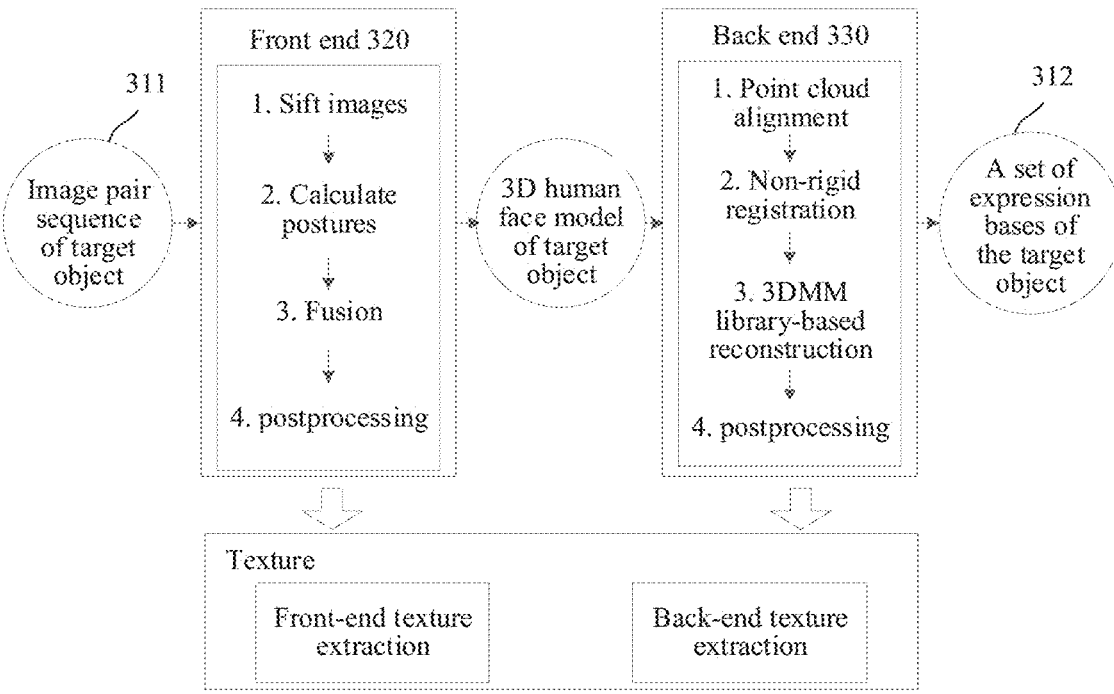
FIG. 3 is a block flowchart related to the technical solutions according to this application.

FIG. 3 is a block flowchart related to the technical solutions according to this application. It may be seen from the block flowchart that, an image pair sequence 311 of a target object is inputted, and the image pair sequence 311 includes a plurality of image pairs. Each image pair includes a color feature image (for example, an RGB image) and a depth image in a head posture, and a set of expression bases 312 of the target object is outputted. The entire procedure includes two parts of front-end processing 320 and back-end processing 330. The front-end processing 320 includes steps such as sifting images, calculating postures, fusion, post-processing, and the like, and then a 3D human face model of a target object is generated finally. The back-end processing 330 includes steps such as point cloud alignment, non-rigid registration (NRICP), 3DMM library-based reconstruction, postprocessing, and the like, and then a set of expression bases 312 of a target object is generated finally. Subsequently, a 3D human face model of the target object in any expression may be generated based on the set of expression bases, and texture rendering may be further performed on the 3D human face model, to generate a 3D human face model with texture of the target object in any expression.

After the set of expression bases of the target object is generated, the set of expression base may be driven to generate a 3D human face model of the target object in any expression, so as to implement different product functions. For example, the technical solutions provided in this application may be applied to scenarios such as game and publicity and issue. In an exemplary application scenario, a user holds a depth camera to scan a head of the user around, then a set of drivable expression bases of the user may be reconstructed. By driving the set of expression bases, a 3D human face model of the user in any expression is generated, and by switching to display 3D human face models in different expressions, the user may communicate with the 3D human face models of the user.

For a method procedure provided in the embodiments of this application, each step may be performed by a terminal such as a mobile phone, a tablet computer, a multimedia player device, or a wearable device, or may be a server. For ease of description, in the following method embodiments, an example in which each step is performed by a computer device is used for description. The computer device may be electronic device having calculating and storage capability, such as the terminal or server described above.

Next, the technical solution of this application is described in detail by using several embodiments.

Figure 4:
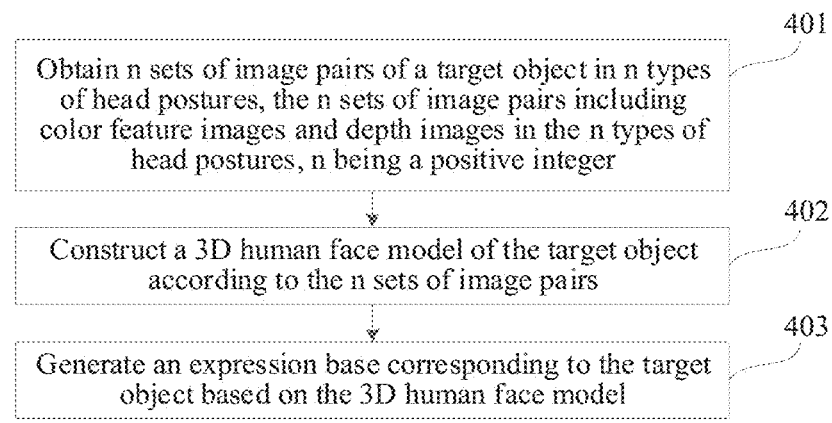
FIG. 4 is a flowchart of a 3D expression base generation method according to an embodiment of this application.

FIG. 4 is a flowchart of a 3D expression base generation method according to an embodiment of this application. The method may include the following steps:

Step 401: Obtain n sets of image pairs of a target object in n types of head postures, then sets of image pairs including color feature images and depth images in the n types of head postures, n being a positive integer.

An $i^{th}$ head posture being corresponding to an $i^{th}$ set of image pair, and $0 < i \leq n$.

The color feature images include any form of RGB images, grayscale images, HSL images, and the like. In this embodiment of this application, RGB images are used as an example for description.

RGB images of a target object refer to color images obtained by photographing the target object by using a camera. Pixel values of an RGB image is represented by using color components of three channels of red (R), green (G), and blue (B).

Depth images of a target object refers to images using distance values from a camera to each point in a scenario in which the target object is located as pixel values. A depth image is also referred to as a distance image. A depth image directly reflects a geometrical shape of a visible surface of an object. A depth image is similar to a grayscale image, except that each pixel value of the depth image is an actual distance from the camera to the object. An RGB image and a depth image of a target object may be registered, and pixels of the two images are in one-to-one correspondence.

An RGB image and a depth image of a target object may be two images obtained through photographing by using a 3D camera. Compared with a normal 2D camera which can only take RGB images, the 3D camera can further take depth images in addition to RGB images. The 3D camera may include a color camera and a depth sensor. The color camera is configured to take RGB images, and the depth sensor is configured to acquire depth information to generate depth images.

In an example, n is 1, and for example, an image pair of a target object in a front-face posture is obtained.

In another example, to improve accuracy of 3D human face reconstruction, n is greater than 1, and for example, the foregoing n types of head postures include a front-face posture, a right side-face posture, a left side-face posture, and a heap-up posture.

Figure 5:
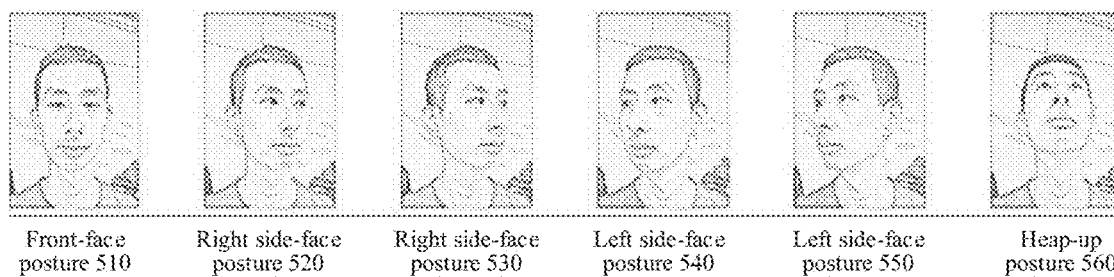
FIG. 5 is a schematic diagram of image pairs of a target object in a plurality of head postures according to an embodiment of this application.

Types of head postures in which the image pairs of the target object obtained by the computer device may be preset. For example, as shown in FIG. 5, image pairs of the target object in 6 head postures are obtained: a front-face posture 510, a right side-face posture 520, a right side-face posture 530, a left side-face posture 540, a left side-face posture 550, and a heap-up posture 560. The right side-face posture 520 and the right side-face posture 530 may be right side-face postures of two different angles, and the left side-face posture 540 and the left side-face posture 550 may be left side-face postures of two different angles.

In some embodiments, a position of a camera configured to acquire image pairs of the target object is fixed, and the target object turns a head of the target object, then the camera captures a plurality of image pairs of the target object. For example, images of an entire process for the target object to turn the head are captured and saved by the camera. For the sake of efficiency, it is not necessary to calculate all the acquired images, because much of the data is repetitive. Hundreds of image pairs are acquired in the entire process for the target object to turn the head, if all the hundreds of image pairs are used for calculation, computing resources may be wasted. Therefore, through image sifting, several representative image pairs can be selected from the hundreds of image pairs for subsequent calculation.

In a possible implementation, candidate image pairs of the target object are obtained, from the candidate image pairs and according to a quality requirement, target image pairs meeting the quality requirement are sifted; and the image pairs corresponding to the n types of head postures are selected from the target image pairs. Unqualified image pairs (such as blinking and motion blur) are removed, and qualified target image pairs are retained, then n image pairs are selected from the qualified target image pairs according to the head posture.

Step 402: Construct a 3D human face model of the target object according to the n sets of image pairs.

The 3D human face model of the target object refers to a 3D model of a human face of the target object constructed based on the image pairs of the target object in the n types of head postures. The 3D human face model includes a point cloud and a triangle topology.

In an exemplary embodiment, step 402 may include the following several substeps:

1. Obtain head posture information and key point information respectively corresponding to the n sets of image pairs.

The head posture information is used for indicating a posture angle of a head of the target object in the image pair, and the key point information is used for indicating positions of human face key points of the target object in the image pair. The human face key points may include key points on human face key parts such as eyebrows, eyes, and mouth.

An example in which head posture information and key point information corresponding to a $k^{th}$ set of image pair in the n image pairs are obtained is used. First, a key point of an RGB image of the $k^{th}$ set of image pair is obtained; then key point information corresponding to the key point is obtained according to a depth image of the $k^{th}$ set of image pair, and the key point information corresponding to the $k^{th}$ set of image pair includes 3D position information of the key point in the depth image; and then head posture information corresponding to the $k^{th}$ set of image pair is determined according to the key point information corresponding to the $k^{th}$ set of image pair, and k is a positive integer less than or equal to n.

First, a key point (also referred to as a landmark point) of a human face is positioned from the RGB image by using a related human face key point positioning algorithm, and then 3D position information of the key point may be obtained by using the key point and a corresponding depth image, including positions of horizontal and vertical coordinates and a depth value in the RGB image. Positions of the same key point in the image pairs are in one-to-one correspondence, for example, positions of a key point, the tip of the nose, are in one-to-one correspondence in the image pairs. After the 3D position information of each key point is obtained, rough head posture information may be calculated by using least squares and other manners. The rough head posture information may be further optimized by using iterative closest point (ICP) and other manners to obtain final head posture information. In addition, the image pairs are photographed when the target object turns the head, so that there are some static places such as the shoulder in the image. When obtaining the head posture information and the key point information, other regions than a head region in the image may be removed first, to improve accuracy of information obtaining.

2. Fuse the head posture information and the key point information respectively corresponding to then image pairs to obtain a point cloud of the target object.

After obtaining the head posture information and the key point information respectively corresponding to the n image pairs, the foregoing information may be fused by using a surfel (surface element) model to obtain the point cloud of the target object.

3. Generate the 3D human face model of the target object according to the point cloud of the target object.

Figure 6:
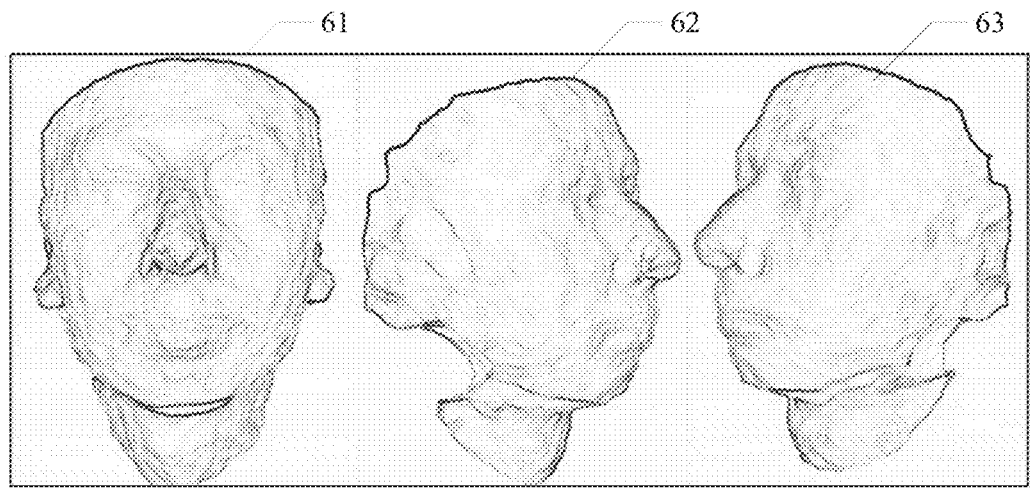
FIG. 6 shows a plurality of views of a 3D human face model of a target object according to an embodiment of this application.

Then, postprocessing is performed on the point cloud of the target object, such as a series of operations of Poisson reconstruction, Laplace smoothing, denoising, and downsampling, to generate the 3D human face model of the target object. FIG. 6 shows views of a plurality of angles of the 3D human face model of the target object generated after reconstructing images of the target object shown in FIG. 5. A left-side FIG. 61 is a view of a front-face angle, a middle FIG. 62 is a view of a right-facing angle, and a right-side FIG. 63 is a view of a left-facing angle.

Step 403: Generate an expression base corresponding to the target object based on the 3D human face model.

The set of expression bases of the target object may include expression bases corresponding to a plurality of different expressions of the target object, and the set of expression bases may be drivable, that is, the 3D human face model of the target object in any expression can be generated based on the set of expression bases.

In an exemplary embodiment, step 403 may include the following several substeps:

1. Perform preliminary point cloud alignment on the 3D human face model of the target object and a benchmark 3D human face model of a standard object.

The standard object is a human face object selected from the 3DMM library. In the foregoing steps, because the 3D position information of the key points of the target object in a plurality of head postures can be obtained, by splicing the 3D position information of the key points, entire 3D position information of the key points of the target object may be obtained. Each key point may be corresponded to the point cloud of the target object by finding the nearest neighbor, so as to find a key point (may be referred to as keypoint) position corresponding to each key point on the 3D human face model of the target object. Preliminary alignment may be performed on the 3D human face model of the target object and the benchmark 3D human face model of the standard object by using the corresponding key point position on the 3D human face model of the target object. An objective of the preliminary point cloud alignment is to convert the point cloud of the target object and a point cloud of the standard object to the same coordinate system. The two point clouds are not in the same coordinates originally, so that the two point clouds are converted to the same coordinate system to facilitate subsequent calculation.

A space position conversion relationship between the point cloud of the target object and the point cloud of the standard object is shown in the formula 2:

$$P_{3dmm} = s \times (R|T) P_{frontend} \quad \text{(formula 2)}$$

where $P_{3dmm}$ is the 3D position information of the key point on the benchmark 3D human face model, $P_{frontend}$ is the 3D position information of the key point on the 3D human face model of the target object, s is a to-be-calculated scaling parameter, R is a to-be-calculated rotation parameter, and T is a to-be-calculated translation parameter.

Figure 7:
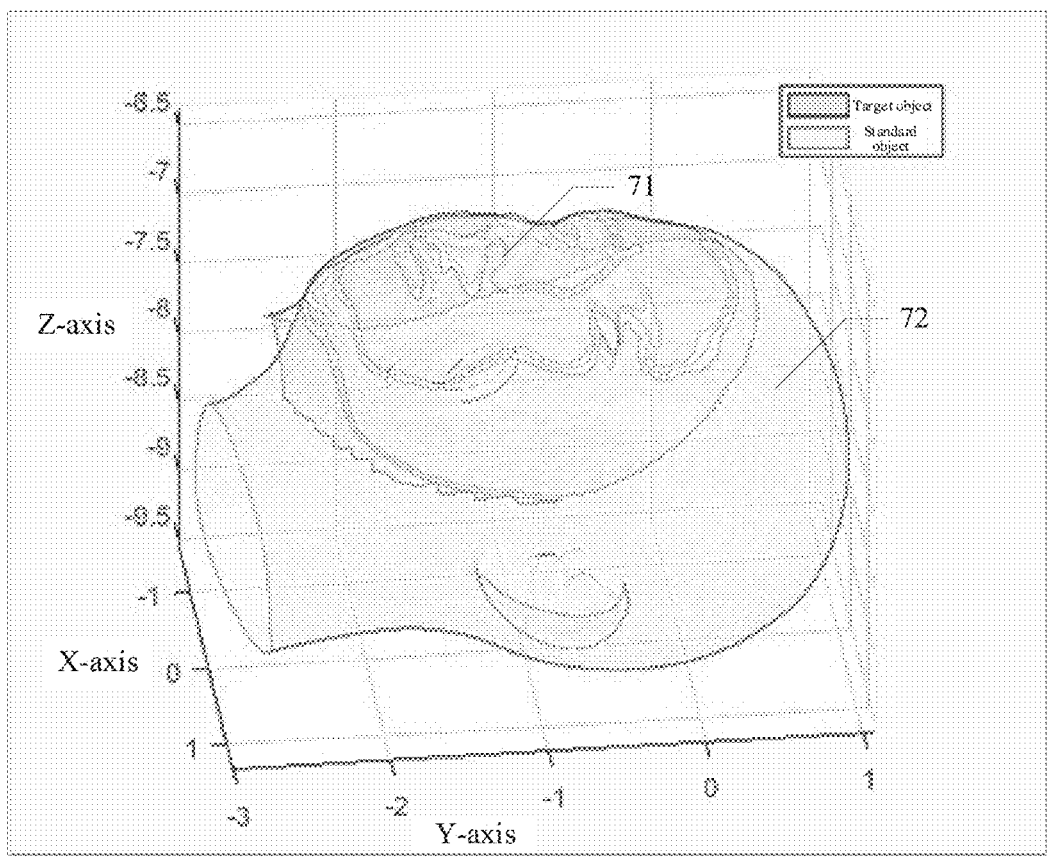
FIG. 7 is an effect diagram obtained after preliminary point cloud alignment is performed on 3D human face models of a target object and a standard object according to an embodiment of this application.

Because the point cloud of the target object is different from the point cloud of the standard object, the two point clouds cannot be perfectly aligned. For example, FIG. 7 is an effect diagram obtained after preliminary point cloud alignment is performed on a 3D human face model 71 of a target object and a 3D human face model 72 of a standard object. It may be seen that, although the 3D human face model 71 of the target object is different from the 3D human face model 72 of the standard object, the two models have been converted to roughly aligned positions.

2. Attach, after the preliminary point cloud alignment, a point cloud of the standard object to a point cloud of the target object to obtain a low-model point cloud of the target object.

The low-model point cloud of the target object is a point cloud relatively similar to the target object in appearance but has less 3D points than that of the point cloud of the target object. The point cloud of the target object obtained through fusion in the foregoing step 402 may be regarded as a high-model point cloud having relatively many 3D points. The low-model point cloud of the target object obtained here has the same quantity of 3D points as that of the point cloud of the standard object in the 3DMM library, but has less 3D points than that of the high-model point cloud of the target object.

The low-model point cloud of the target object obtained in this step is a point cloud having the same quantity of point clouds as that of the point cloud of the standard object in the 3DMM library. In this case, the generated low-model point cloud of the target object satisfies a topological structure of the 3DMM library, and therefore, a set of drivable expression bases of the target object may be generated.

In addition, the point cloud of the standard object may be attached to the point cloud of the target object by using the NRICP. After the NRICP is performed once, a newly generated point cloud may be used to replace the point cloud of the standard object, the foregoing step 1 and step 2 are repeated to perform point cloud alignment and NRICP, and after several iterations, a low-model point cloud of the target object satisfying the topological structure of the 3DMM library is obtained. During iteration, more face points, not only the key points, may be used for calculation. In this case, the finally generated low-model point cloud of the target object may be highly similar to the high-model point cloud of the target object.

3. Generate a set of expression bases of the target object according to the low-model point cloud of the target object.

After the low-model point cloud of the target object satisfying the topological structure of the 3DMM library is obtained, a shape coefficient and an expression coefficient of the target object may be matched from the 3DMM library by using the foregoing formula 1. The shape coefficient of the target object is used for controlling an appearance of the target object, and the expression coefficient of the target object is used for controlling an expression of the target object. The expression base of the target object may be generated by adjusting the expression coefficient of the target object. In addition, postprocessing is further required to be performed on the human face of the target object to fix the detail part of the facial feature points.

Figure 8:
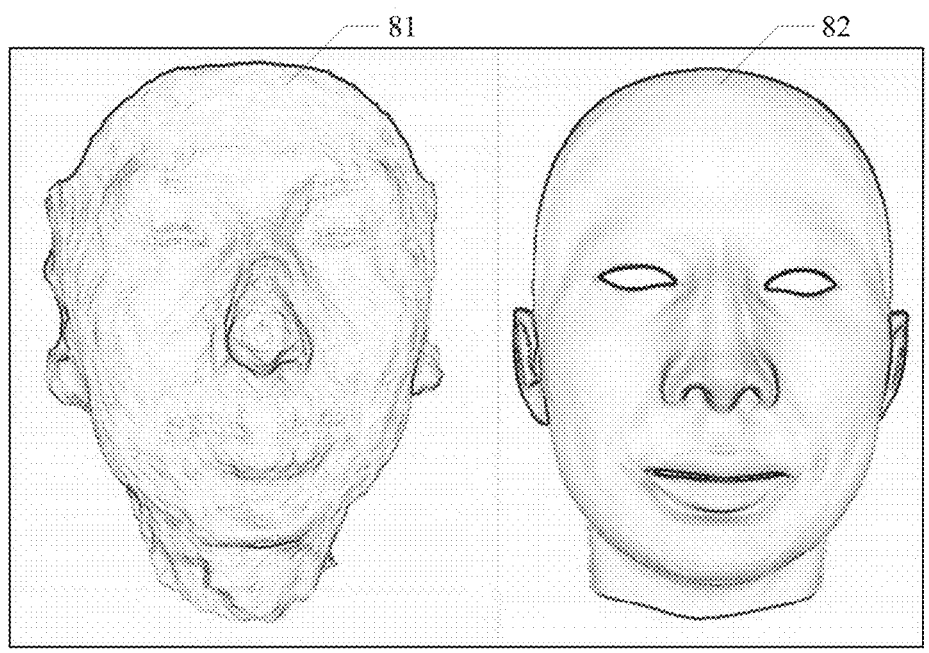
FIG. 8 is a schematic diagram of 3D human face models corresponding to a high-model point cloud and a low-model point cloud of a target object according to an embodiment of this application.
Figure 9:
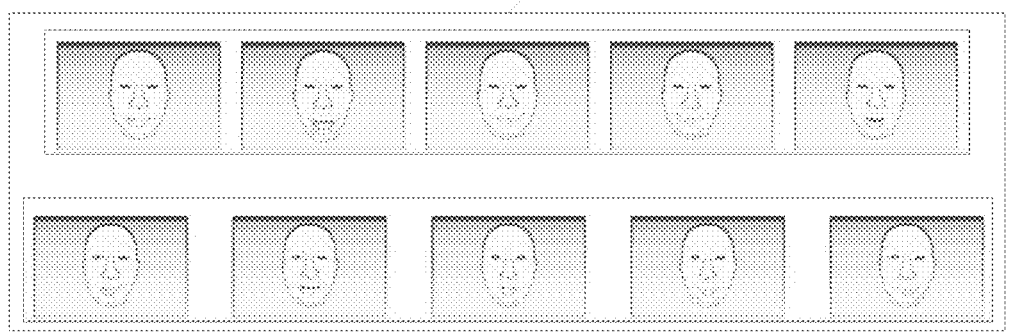
FIG. 9 is a schematic diagram of a set of expression bases of a target object according to an embodiment of this application.

For example, as shown in FIG. 8, a left-side figure in FIG. 8 shows a 3D human face model 81 corresponding to the high-model point cloud of the target object, and a right-side figure shows a 3D human face model 82 corresponding to the low-model point cloud of the target object. As shown in FIG. 9, a set of expression bases 90 of the target object may be generated by adjusting the expression coefficient according to the low-model point cloud of the target object.

In conclusion, according to the technical solutions provided in this embodiment of this application, an image pair of a target object in at least one head posture is obtained, a 3D human face model of the target object is constructed based on the image pair, and a set of expression bases of the target object is generated based on the 3D human face model, so that more diversified product functions may be expended based on the set of expression bases.

In addition, preliminary point cloud alignment is performed on the 3D human face model of the target object and the 3D human face model of the standard object. After the preliminary point cloud alignment, the point cloud of the standard object is attached to the point cloud of the target object to obtain a low-model point cloud of the target object, and the low-model point cloud of the target object is a point cloud similar to the target object in appearance and satisfying the topological structure of the 3DMM library, and therefore, a set of high-precision and drivable expression bases may be generated for the target object.

In an exemplary embodiment, after the foregoing step 403, the following steps are further included:

1. Extract a texture map of the target object from the color feature images of the n sets of image pairs.

For example, an example in which the color feature images are implemented as RGB images is used for description.

In some embodiments, texture maps of the target object in a head posture are respectively extracted from the RGB images, and a complete texture map of the target object may be obtained by fusing the texture maps in all head postures.

Figure 10:
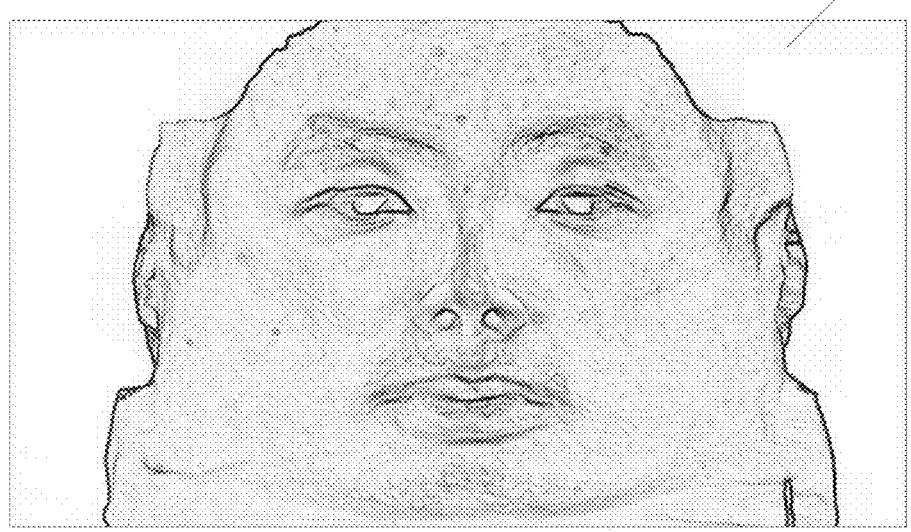
FIG. 10 is a schematic diagram of a texture map corresponding to a 3D human face model constructed based on a high-model point cloud of a target object according to an embodiment of this application.
Figure 11:
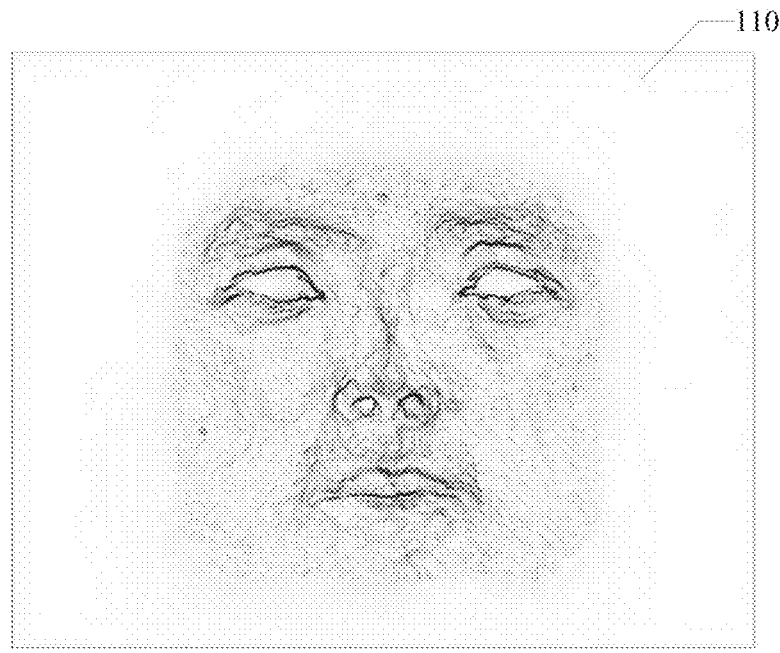
FIG. 11 is a schematic diagram of a texture map corresponding to a 3D human face model constructed based on a low-model point cloud of a target object according to an embodiment of this application.

FIG. 10 shows a texture map 100 corresponding to a 3D human face model. The 3D human face model is a model (that is, the 3D human face model shown in the left-side figure in FIG. 8) constructed based on the high-model point cloud of the target object. FIG. 11 shows a texture map 110 corresponding to a 3D human face model. The 3D human face model is a model (that is, the 3D human face model shown in the right-side figure in FIG. 8) constructed based on the low-model point cloud of the target object.

2. Generate a 3D human face model with texture of the target object in a target expression according to the expression base and the texture map of the target object.

Figure 12:
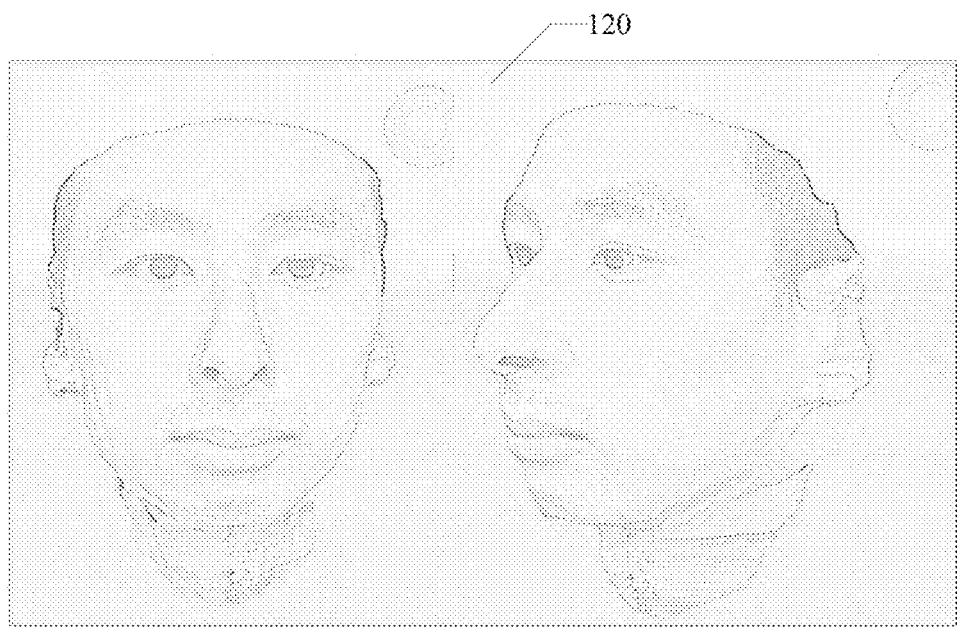
FIG. 12 is a schematic diagram of a 3D human face model with texture rendered based on the texture map shown in FIG. 10 according to an embodiment of this application.

The target expression corresponds to the expression base. By sending the 3D human face model corresponding to the high-model point cloud of the target object and the texture map shown in FIG. 10 into a rendering engine, a 3D human face model 120 with texture shown in FIG. 12 may be obtained through rendering. However, the 3D human face model 120 shown in FIG. 12 is not drivable because the 3D human face model does not satisfy the topological structure of the 3DMM library.

Figure 13:
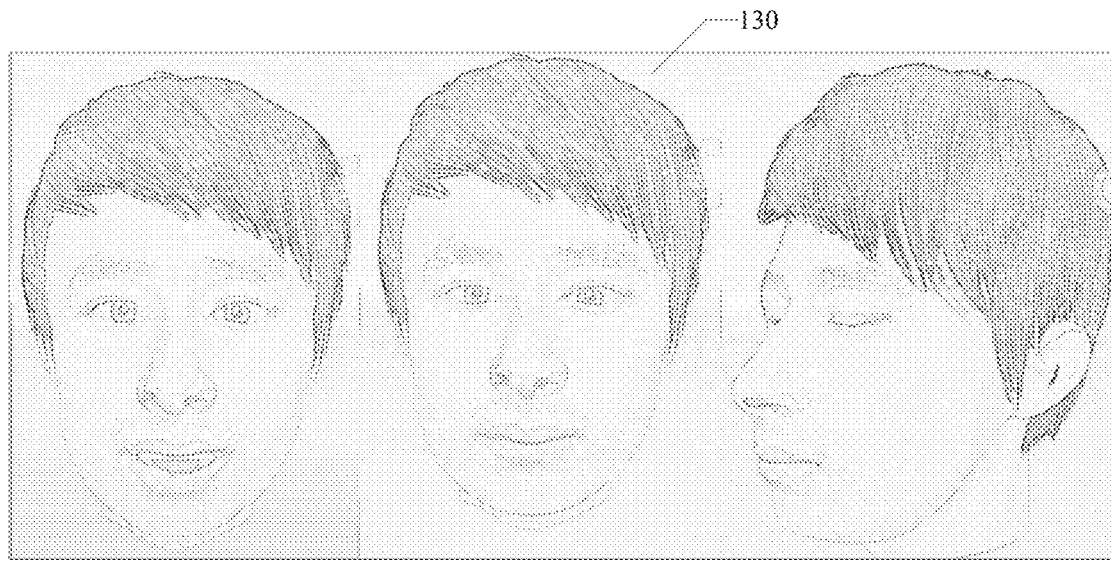
FIG. 13 is a schematic diagram of a 3D human face model with texture rendered based on the texture map shown in FIG. 11 according to an embodiment of this application.

By sending the 3D human face model corresponding to the low-model point cloud of the target object and the texture map shown in FIG. 11 into the rendering engine, a 3D human face model 130 with texture shown in FIG. 13 may be obtained through rendering. The 3D human face model 130 shown in FIG. 13 is drivable because the 3D human face model satisfies the topological structure of the 3DMM library. For example, 3D human face models of the target object in different expressions may be generated by using different expression coefficients, and then texture rendering is performed by using a rendering engine, so that 3D human face model with texture of the target object in different expressions may be obtained. FIG. 13 schematically shows typical action effects of mouth opening, mouth closing, blink, and the like, and eyeballs, tooth, hair, and the like in FIG. 13 may be additionally added accessories.

An example of generating a 3D human face model with texture of the target object in a target expression is used. First, a target expression coefficient corresponding to the target expression is determined; and then a 3D human face model of the target object in the target expression is generated according to the target expression coefficient and the set of expression bases of the target object; and the 3D human face model in the target expression is rendered by using a texture map of the target object, to obtain a 3D human face model with texture in the target expression.

Through the foregoing manners, a 3D human face model with texture of the target object in any expression is generated based on the set of expression bases of the target object and further according to the expression bases and the texture map of the target object, so as to provide more diversified product functions.

Next, the technical solution of this application is described by using an example in which the method is applied in a speech interaction scenario.

Figure 14:
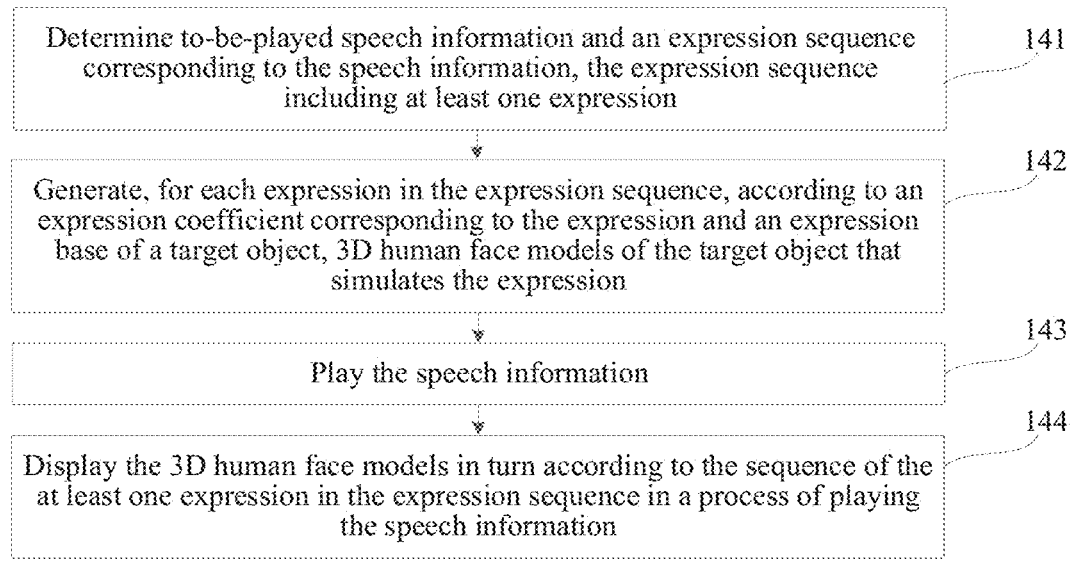
FIG. 14 is a flowchart of a speech-expression interaction method according to an embodiment of this application.

FIG. 14 is a flowchart of a speech-expression interaction method according to an embodiment of this application. The method may be performed by a terminal such as a mobile phone, a tablet computer, or a wearable device. The method may include the following steps:

Step 141: Determine to-be-played speech information and an expression sequence corresponding to the speech information, the expression sequence including at least one expression.

A mapping relationship between the speech information and the expression sequence may be pre-stored. After a to-be-played speech information is determined, an expression sequence corresponding to the speech information may be found according to the mapping relationship. For example, a mapping relationship between pronunciations and expressions may be stored. After a to-be-played speech information is determined, a pronunciation sequence corresponding to the speech information may be determined, and the pronunciation sequence includes at least one pronunciation ranked in order. Expressions corresponding to the pronunciations are obtained, and therefore an expression sequence corresponding to the speech information may be obtained.

Step 142: Generate, for each expression in the expression sequence, according to an expression coefficient corresponding to the expression and an expression base of a target object described above, 3D human face models of the target object that simulates the expression.

An example of generating a target expression of the target object is used. A target expression coefficient corresponding to the target expression is determined; and then a 3D human face model of the target object in the target expression is generated according to the target expression coefficient and the set of expression bases of the target object.

In some embodiments, the 3D human face models are rendered by using a texture map of the target object to obtain 3D human face models with texture.

In some embodiments, the set of expression bases of the target object is generated by using the following manner: obtaining n sets of image pairs of a target object in n types of head postures through photographing, the image pairs including color feature images (for example RGB images) and depth images in the n types of head postures, n being a positive integer, 0<i≤n; and generating the set of expression bases of the target object according to the n image pairs. For a generation process of the expression base, reference may be made to the description in the foregoing embodiments, and details are not repeated in this embodiment.

Step 143: Play the speech information.

Step 144: While playing the speech information, display the 3D human face models in turn according to the sequence of the at least one expression in the expression sequence in a process of playing the speech information.

In some embodiments, the 3D human face models with texture are displayed in turn according to the sequence of the at least one expression in the expression sequence in a process of playing the speech information.

In conclusion, in the technical solution provided in the embodiments of this application, an expression sequence corresponding to a to-be-played speech information is determined; 3D human face models of a target object in expressions are generated according to expression coefficients corresponding to the expressions and expression bases of the target object; and the 3D human face models in the expressions are displayed in turn according to a sequence of the expressions in the expression sequence in a process of playing the speech information. Therefore, a speech-expression interaction method based on a model reconstructed through 3D human face is implemented, and matched expressions can be displayed according to played speeches in real time, which is more realistic.

The following is an apparatus embodiment of this application, which can be used to perform the method embodiments of this application. For details not disclosed in the apparatus embodiment of this application, reference may be made to the method embodiments of this application.

Figure 15:
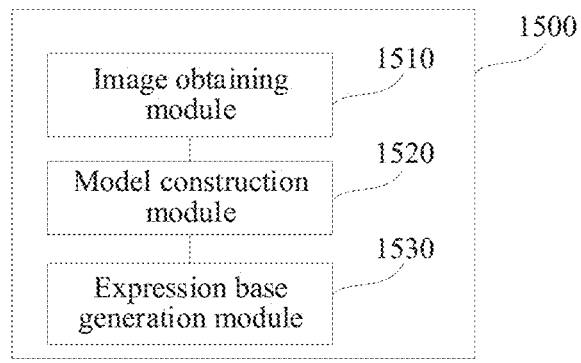
FIG. 15 is a block diagram of a 3D expression base generation apparatus according to an embodiment of this application.

FIG. 15 is a flowchart of a 3D expression base generation apparatus according to an embodiment of this application. The apparatus has a function of implementing the 3D expression base generation method example, and the function may be realized by hardware or by hardware executing corresponding software. The apparatus may be the computer device described above or may be disposed in a computer device. An apparatus 1500 may include: an image obtaining module 1510, a model construction module 1520, and an expression base generation module 1530.

The image obtaining module 1510 is configured to obtain n sets of image pairs of a target object inn types of head postures, the n sets of image pairs including color feature images and depth images in the n types of head postures, an $i^{th}$ head posture being corresponding to an $i^{th}$ set of image pair, n being a positive integer, 0<i≤n.

The model construction module 1520 is configured to construct a 3D human face model of the target object according to then sets of image pairs.

The expression base generation module 1530 is configured to generate a set of expression bases corresponding to the target object based on the 3D human face model.

In conclusion, according to the technical solutions provided in this embodiment of this application, an image pair of a target object in at least one head posture is obtained, a 3D human face model of the target object is constructed based on the image pair, and a set of expression bases of the target object is generated based on the 3D human face model, so that more diversified product functions may be expended based on the set of expression bases.

Figure 16:
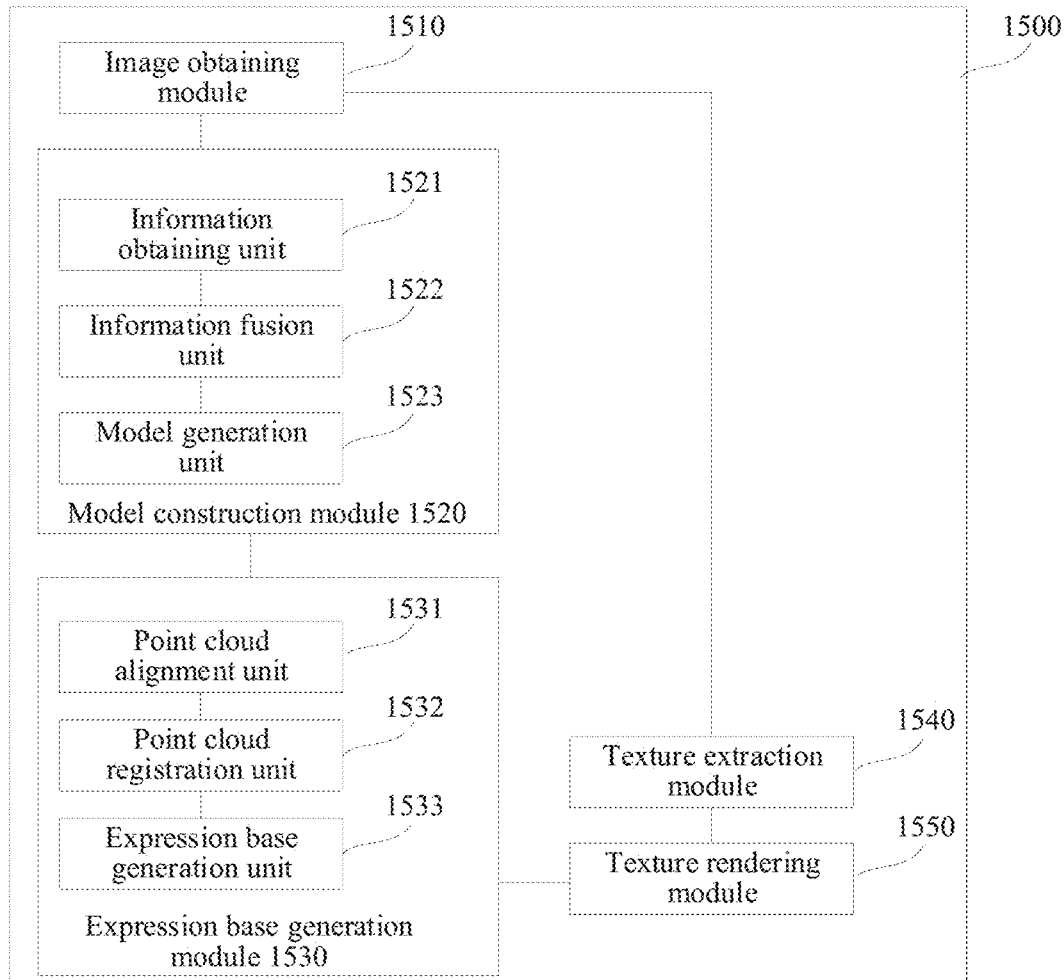
FIG. 16 is a block diagram of a 3D expression base generation apparatus according to another embodiment of this application.

In an exemplary embodiment, as shown in FIG. 16, the model construction module 1520 includes: an information obtaining unit 1521, an information fusion unit 1522, and a model generation unit 1523.

The information obtaining unit 1521 is configured to obtain head posture information and key point information respectively corresponding to the n sets of image pairs.

The information fusion unit 1522 is configured to fuse the head posture information and the key point information to obtain a point cloud corresponding to a head of the target object.

The model generation unit 1523 is configured to generate the 3D human face model of the target object according to the point cloud.

In an exemplary embodiment, the information obtaining unit 1521 is configured to:

obtain a key point in the color feature image of a $k^{th}$ set of image pair in the n sets of image pairs, $0<k\le n$;

obtain the key point information corresponding to the key point according to the depth image of the $k^{th}$ set of image pair, the key point information including 3D position information of the key point in the depth image; and determine the head posture information corresponding to the $k^{th}$ set of image pair according to the key point information.

In an exemplary embodiment, as shown in FIG. 16, the expression base generation module 1530 includes: a point cloud alignment unit 1531, a point cloud registration unit 1532, and an expression base generation unit 1533.

The point cloud alignment unit 1531 is configured to perform preliminary point cloud alignment on the 3D human face model and a benchmark 3D human face model of a standard object.

The point cloud registration unit 1532 is configured to attach a point cloud of the standard object to the point cloud of the target object to obtain a low-model point cloud of the target object.

The expression base generation unit 1533 is configured to generate the expression base corresponding to the target object according to the low-model point cloud.

In an exemplary embodiment, the expression base generation unit 1533 is configured to:

determine a shape coefficient and an expression coefficient corresponding to the target object according to the low-model point cloud, the shape coefficient being used for controlling an appearance of the target object, and the expression coefficient being used for controlling an expression of the target object; and adjust the expression coefficient of the target object to obtain the expression base corresponding to the target object.

In an exemplary embodiment, as shown in FIG. 16, the apparatus 1500 further includes: a texture extraction module 1540 and a texture rendering module 1550.

The texture extraction module 1540 is configured to extract a texture map of the target object from the color feature images of the n sets of image pairs.

The texture rendering module 1550 is configured to generate a 3D human face model with texture of the target object in a target expression according to the expression base and the texture map, the target expression being corresponding to the expression base.

In an exemplary embodiment, the texture rendering module 1550 is configured to:

determine a target expression coefficient corresponding to the target expression;

generate a 3D human face model of the target object in the target expression according to the target expression coefficient and the expression base; and render the 3D human face model in the target expression by using the texture map to obtain the 3D human face model with texture in the target expression.

In an exemplary embodiment, the image obtaining module 1510 is further configured to:

obtain candidate image pairs of the target object;

sift, from the candidate image pairs and according to a quality requirement, target image pairs meeting the quality requirement; and select the image pairs corresponding to the n types of head postures from the target image pairs.

Figure 17:
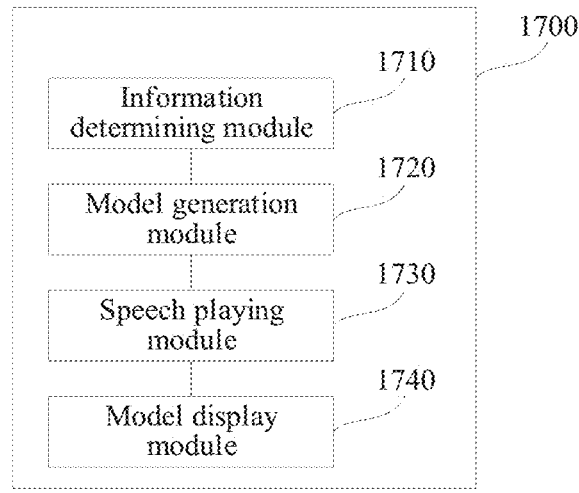
FIG. 17 is a block diagram of a speech interaction apparatus according to an embodiment of this application.

FIG. 17 is a block diagram of a speech interaction apparatus according to an embodiment of this application. The apparatus has a function of implementing the speech-expression interaction method example, and the function may be realized by hardware or by hardware executing corresponding software. The apparatus may be the terminal described above, or may be disposed on the terminal. An apparatus 1700 may include: an information determining module 1710, a model generation module 1720, a speech playing module 1730, and a model display module 1740.

The information determining module 1710 is configured to determine to-be-played speech information and an expression sequence corresponding to the speech information, the expression sequence including at least one expression.

The model generation module 1720 is configured to generate 3D human face models of the target object using the expression base corresponding to the target object and the expression sequence corresponding to the speech information.

The speech playing module 1730 is configured to play the speech information.

The model display module 1740 is configured to display the 3D human face models in turn according to a sequence of the at least one expression in the expression sequence in a process of playing the speech information.

In conclusion, in the technical solution provided in the embodiments of this application, an expression sequence corresponding to the to-be-played speech information is determined; 3D human face models of a target object in expressions are generated according to expression coefficients corresponding to the expressions and expression bases of the target object; and the 3D human face models in the expressions are displayed in turn according to a sequence of the expressions in the expression sequence in a process of playing the speech information. Therefore, a speech-expression interaction method based on a model reconstructed through 3D human face is implemented, and matched expressions can be displayed according to played speeches in real time, which is more realistic.

Figure 18:
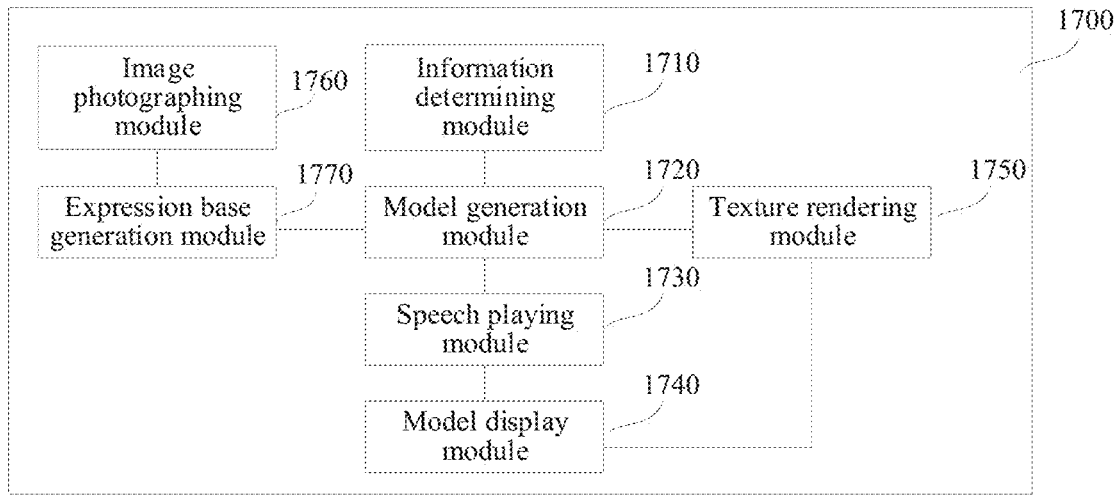
FIG. 18 is a block diagram of a speech interaction apparatus according to another embodiment of this application.

In an exemplary embodiment, as shown in FIG. 18, the apparatus 1700 further includes: a texture rendering module 1750.

The texture rendering module 1750 is configured to render the 3D human face models by using a texture map of the target object to obtain 3D human face models with texture.

The model display module 1740 is further configured to display the 3D human face models with texture in turn according to the sequence of the at least one expression in the expression sequence in a process of playing the speech information.

In an exemplary embodiment, as shown in FIG. 18, the apparatus 1700 further includes: an image photographing module 1760 and an expression base generation module 1770.

The image photographing module 1760 is configured to obtain n sets of image pairs of the target object in n types of head postures through photographing, the n sets of image pairs including color feature images and depth images in the n types of head postures, an $i^{th}$ head posture being corresponding to an $i^{th}$ set of image pair, n being a positive integer.

The expression base generation module 1770 is configured to generate an expression base corresponding to the target object according to then sets of image pairs.

When the apparatus provided in the foregoing embodiment implements its functions, a description is given only by using the foregoing division of function modules as an example. In actual applications, the functions may be allocated to and implemented by different function modules according to the requirements, that is, the internal structure of the device may be divided into different function modules, to implement all or some of the functions described above. In addition, the apparatus and method embodiments provided in the foregoing embodiments belong to the same conception. For the specific implementation process, refer to the method embodiments, so the details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 19:
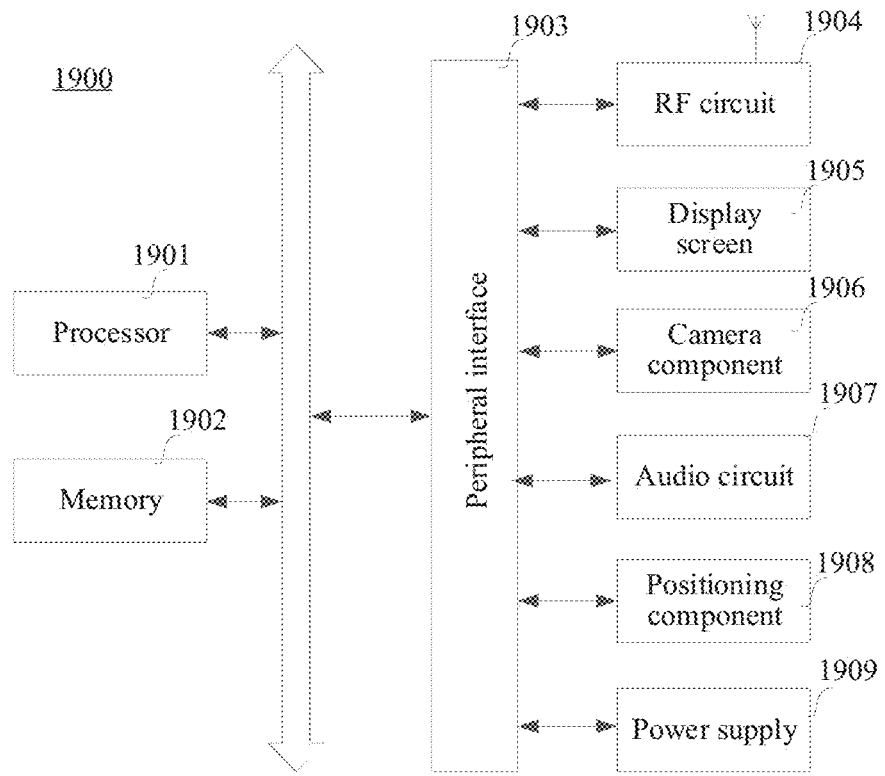
FIG. 19 is a schematic structural diagram of a terminal according to an embodiment of this application.

FIG. 19 is a structural block diagram of a terminal 1900 according to an embodiment of this application. The terminal 1900 may be a mobile phone, a tablet computer, a wearable device, a multimedia playback device, a camera, and another electronic device.

Generally, a terminal 1900 includes a processor 1901 and a memory 1902.

The processor 1901 may include one or more processing cores. For example, the processor may be a 4-core processor or a 19-core processor. The processor 1901 may be implemented by using at least one hardware form of a digital signal processor (DSP), a field programmable gate array (FPGA), and a programmable logic array (PLA). The processor 1901 may alternatively include a main processor and a coprocessor. The main processor is configured to process data in an active state, also referred to as a central processing unit (CPU). The coprocessor is a low-power processor configured to process data in a standby state. In some embodiments, the processor 1901 may be integrated with a graphics processing unit (GPU). The GPU is configured to render and draw content that needs to be displayed on a display screen. In some embodiments, the processor 1901 may further include an AI processor. The AI processor is configured to process computing operations related to machine learning.

The memory 1902 may include one or more computer-readable storage media. The computer-readable storage media may be non-transient. The memory 1902 may further include a high-speed random access memory (RAM) and a non-transitory memory, for example, one or more magnetic disk storage devices or flash storage devices. In some embodiments, a non-transitory computer-readable storage medium in the memory 1902 is configured to store at least one instruction, at least one program, a code set, or an instruction set, the at least one instruction, the at least one program, the code set, or the instruction set being configured to be executed by the processor 1901 to implement the 3D expression base generation method or the speech-expression interaction method provided in the method embodiments of this application.

In some embodiments, the terminal 1900 may include a peripheral interface 1903 and at least one peripheral. The processor 1901, the memory 1902, and the peripheral interface 1903 may be connected by a bus or a signal cable. Each peripheral may be connected to the peripheral interface 1903 through a bus, a signal cable, or a circuit board. Specifically, the peripheral includes at least one of a radio frequency (RF) circuit 1904, a touch display screen 1905, a camera component 1906, an audio circuit 1907, a positioning component 1908, and a power supply 1909.

A person skilled in the art may understand that the structure shown in FIG. 19 does not constitute a limitation to the terminal 1900, and the terminal may include more or fewer components than those shown in the figure, or some components may be combined, or a different component arrangement may be used.

Figure 20:
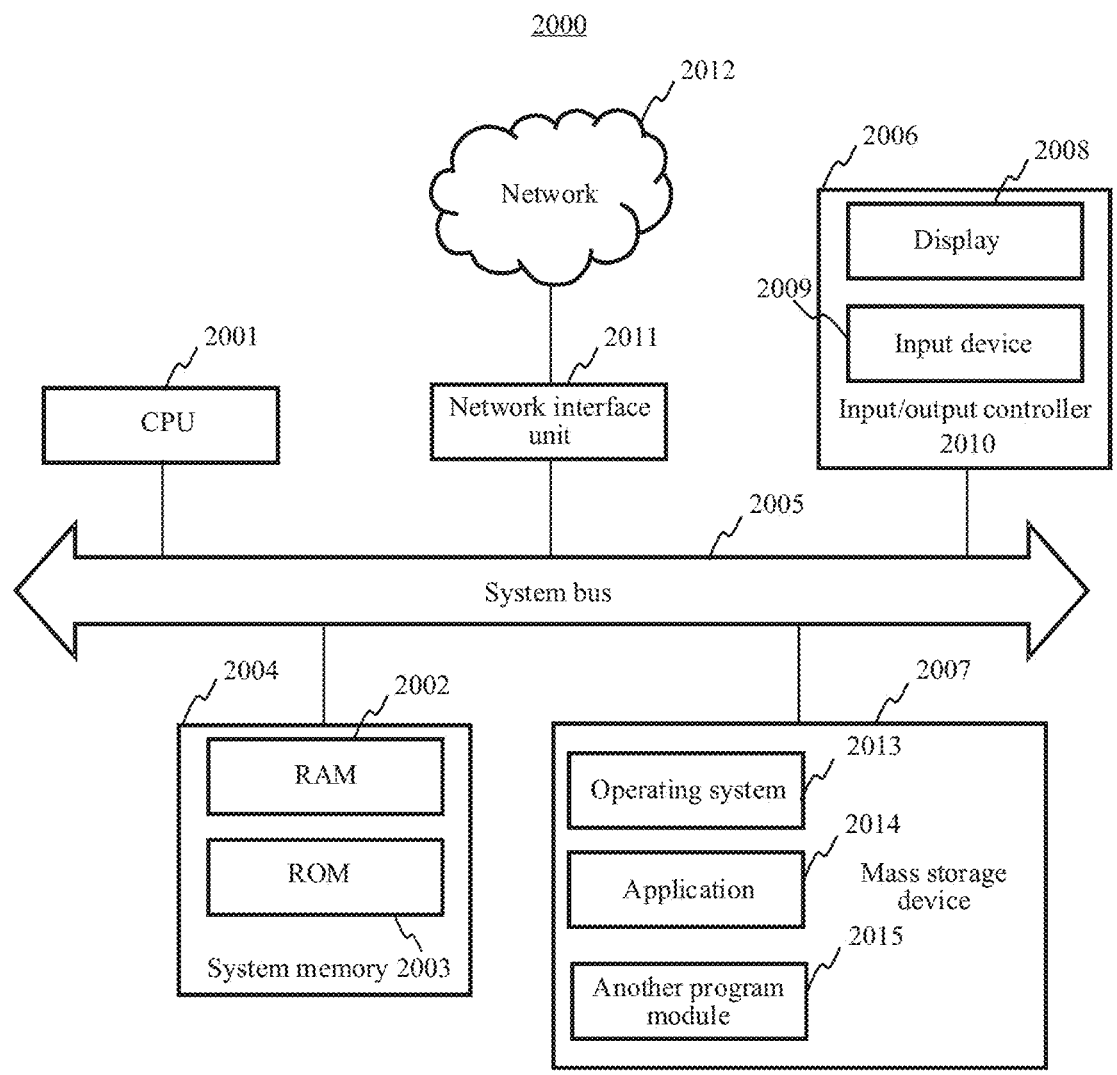
FIG. 20 is a schematic structural diagram of a server according to an embodiment of this application.

FIG. 20 is a schematic structural diagram of a computer device according to an embodiment of this application. Specifically, the computer device 2000 includes a CPU 2001, a system memory 2004 including a RAM 2002 and a read only memory (ROM) 2003, and a system bus 2005 connecting the system memory 2004 and the central processing unit 2001. The computer device 2000 further includes a basic input/output system (I/O) system 2006 for facilitating information transmission between various devices in a computer and a mass storage device 2007 configured to store an operating system 2013, an application 2014, and other application modules 2015.

The basic I/O system 2006 includes a display 2008 configured to display information and an input device 2009 such as a mouse and a keyboard for a user to input information. The display 2008 and the input device 2009 are both connected to the CPU 2001 through an input/output controller 2010 connected to the system bus 2005. The basic I/O system 2006 may further include the input/output controller 2010 for receiving and processing input from a plurality of other devices such as a keyboard, a mouse, an electronic stylus, or the like. Similarly, the input/output controller 2010 further provides output to a display screen, a printer, or other types of output devices.

The mass storage device 2007 is connected to the central processing unit 2001 through a mass storage controller (not shown) connected to the system bus 2005. The mass storage device 2007 and an associated computer-readable medium provide non-volatile storage for the computer device 2000. That is, the mass storage device 2007 may include a computer-readable medium (not shown) such as a hard disk or a compact disc ROM (CD-ROM) drive.

In general, the computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), a flash memory, or other solid storage technologies; a CD-ROM, or other optical storages; and a cassette, a magnetic tape, a disk storage, or other magnetic storage devices. Certainly, those skilled in the art may learn that the computer storage medium is not limited to the above. The foregoing system memory 2004 and mass storage device 2007 may be collectively referred to as a memory.

According to the various embodiments of this application, the computer device 2000 may further be connected, through a network such as the Internet, to a remote computer on the network for running. That is, the computer device 2000 may be connected to a network 2012 by using a network interface unit 2011 connected to the system bus 2005, or may be connected to another type of network or a remote computer system (not shown) by using a network interface unit 2011.

The memory further includes at least one instruction, at least one program, a code set, or an instruction set. The at least one instruction, the at least one program, the code set, or the instruction set is stored in the memory and is configured to be executed by one or more processors to implement the 3D expression base generation method In an exemplary embodiment, a computer-readable storage medium is further provided, storing at least one instruction, at least one program, a code set, or an instruction set, the at least one instruction, the at least one program, the code set, or the instruction set being executed by a processor of a computer device to implement the 3D expression base generation method.

In an exemplary embodiment, a computer-readable storage medium is further provided, the storage medium storing at least one instruction, at least one program, a code set, or an instruction set, the at least one instruction, the at least one program, the code set, or the instruction set, when executed by a processor of a terminal, implementing the 3D expression base generation method or the speech-expression interaction method.

In some embodiments, the computer-readable storage medium may include a ROM, a RAM, a solid state drive (SSD), an optical disc, or the like. The RAM may include a resistance RAM (ReRAM) and a dynamic RAM (DRAM).

In an exemplary embodiment, a computer program product is further provided, the computer program product, when executed by a processor of a computer device, being configured to implement the 3D expression base generation method.

In an exemplary embodiment, a computer program product is further provided, the computer program product, when executed by a processor of a terminal, being configured to implement the 3D expression base generation method or the speech-expression interaction method.

"A plurality of" mentioned in the specification means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A computer-implemented method performed by a computer device, the method comprising:

obtaining n sets of image pairs of a target object in n types of head postures, the n sets of image pairs comprising color feature images and depth images in the n types of head postures, an $i^{th}$ head posture being corresponding to an $i^{th}$ set of image pair, n being a positive integer, $0 < i \leq n$;

constructing a 3D human face model of the target object according to the n sets of image pairs;

generating an expression base corresponding to the target object based on the 3D human face model;

extracting a texture map of the target object from the color feature images of the n sets of image pairs; and generating a 3D human face model with texture of the target object according to the expression base and the texture map.

2. The method according to claim 1, wherein the constructing a 3D human face model of the target object according to the n sets of image pairs comprises:

obtaining head posture information and key point information respectively corresponding to the n sets of image pairs;

fusing the head posture information and the key point information to obtain a point cloud corresponding to a head of the target object; and generating the 3D human face model of the target object according to the point cloud.

3. The method according to claim 2, wherein the obtaining head posture information and key point information respectively corresponding to the n sets of image pairs comprises:

obtaining a key point in the color feature image of a $k^{th}$ set of image pair in the n sets of image pairs, $0 < k \leq n$;

obtaining the key point information corresponding to the key point according to the depth image of the $k^{th}$ set of image pair, the key point information comprising 3D position information of the key point in the depth image; and determining the head posture information corresponding to the $k^{th}$ set of image pair according to the key point information.

4. The method according to claim 1, wherein the generating an expression base corresponding to the target object based on the 3D human face model comprises:

performing preliminary point cloud alignment on the 3D human face model and a benchmark 3D human face model of a standard object;

attaching a point cloud of the standard object to the point cloud of the target object to obtain a low-model point cloud of the target object; and generating the expression base corresponding to the target object according to the low-model point cloud.

5. The method according to claim 4, wherein the generating the expression base corresponding to the target object according to the low-model point cloud comprises:

determining a shape coefficient and an expression coefficient corresponding to the target object according to the low-model point cloud, the shape coefficient being used for controlling an appearance of the target object, and the expression coefficient being used for controlling an expression of the target object; and adjusting the expression coefficient of the target object to obtain the expression base corresponding to the target object.

6. The method according to claim 1, wherein the generating a 3D human face model with texture of the target object according to the expression base and the texture map comprises:

determining a target expression coefficient corresponding to a target expression of the 3D human face model;

generating a 3D human face model of the target object in the target expression according to the target expression coefficient and the expression base; and rendering the 3D human face model in the target expression by using the texture map to obtain the 3D human face model with texture in the target expression.

7. The method according to claim 1, wherein the obtaining n sets of image pairs of a target object in n types of head postures comprises:

obtaining candidate image pairs of the target object;
sifting, from the candidate image pairs and according to a quality requirement, target image pairs meeting the quality requirement; and
selecting the image pairs corresponding to the n types of head postures from the target image pairs.

8. The method according to claim 1, further comprising:
determining an expression sequence corresponding to speech information to be played, the expression sequence comprising at least one expression;
generating 3D human face models of the target object using the expression base corresponding to the target object and the expression sequence corresponding to the speech information; and
displaying the 3D human face models in turn according to a sequence of the at least one expression in the expression sequence in a process of playing the speech information.

9. The method according to claim 8, wherein after the generating 3D human face models of the target object using the expression base corresponding to the target object and the expression sequence corresponding to the speech information, the method further comprises:
rendering the 3D human face models by using a texture map of the target object; and
the displaying the 3D human face models in turn according to a sequence of the at least one expression in the expression sequence in a process of playing the speech information comprises:
displaying the 3D human face models with texture in turn according to the sequence of the at least one expression in the expression sequence in the process of playing the speech information.

10. A computer device, comprising a processor and a memory, the memory storing at least one program, the at least one program being loaded and executed by the processor to perform a plurality of operations including:
obtaining n sets of image pairs of a target object in n types of head postures, the n sets of image pairs comprising color feature images and depth images in the n types of head postures, an $i^{th}$ head posture being corresponding to an $i^{th}$ set of image pair, n being a positive integer, $0<i\leq n$;
constructing a 3D human face model of the target object according to the n sets of image pairs;
generating an expression base corresponding to the target object based on the 3D human face model;
extracting a texture map of the target object from the color feature images of the n sets of image pairs; and
generating a 3D human face model with texture of the target object according to the expression base and the texture map.

11. The computer device according to claim 10, wherein the constructing a 3D human face model of the target object according to the n sets of image pairs comprises:
obtaining head posture information and key point information respectively corresponding to the n sets of image pairs;

fusing the head posture information and the key point information to obtain a point cloud corresponding to a head of the target object; and
generating the 3D human face model of the target object according to the point cloud.

12. The computer device according to claim 11, wherein the obtaining head posture information and key point information respectively corresponding to the n sets of image pairs comprises:
obtaining a key point in the color feature image of a $k^{th}$ set of image pair in the n sets of image pairs, $0<k\leq n$;
obtaining the key point information corresponding to the key point according to the depth image of the $k^{th}$ set of image pair, the key point information comprising 3D position information of the key point in the depth image; and
determining the head posture information corresponding to the $k^{th}$ set of image pair according to the key point information.

13. The computer device according to claim 10, wherein the generating an expression base corresponding to the target object based on the 3D human face model comprises:
performing preliminary point cloud alignment on the 3D human face model and a benchmark 3D human face model of a standard object;
attaching a point cloud of the standard object to the point cloud of the target object to obtain a low-model point cloud of the target object; and
generating the expression base corresponding to the target object according to the low-model point cloud.

14. The computer device according to claim 13, wherein the generating the expression base corresponding to the target object according to the low-model point cloud comprises:
determining a shape coefficient and an expression coefficient corresponding to the target object according to the low-model point cloud, the shape coefficient being used for controlling an appearance of the target object, and the expression coefficient being used for controlling an expression of the target object; and
adjusting the expression coefficient of the target object to obtain the expression base corresponding to the target object.

15. The computer device according to claim 10, wherein the generating a 3D human face model with texture of the target object according to the expression base and the texture map comprises:
determining a target expression coefficient corresponding to a target expression of the 3D human face model;
generating a 3D human face model of the target object in the target expression according to the target expression coefficient and the expression base; and
rendering the 3D human face model in the target expression by using the texture map to obtain the 3D human face model with texture in the target expression.

16. The computer device according to claim 10, wherein the obtaining n sets of image pairs of a target object in n types of head postures comprises:
obtaining candidate image pairs of the target object;
sifting, from the candidate image pairs and according to a quality requirement, target image pairs meeting the quality requirement; and
selecting the image pairs corresponding to the n types of head postures from the target image pairs.

17. The computer device according to claim 10, wherein the plurality of operations further comprise:

determining an expression sequence corresponding to speech information to be played, the expression sequence comprising at least one expression;

generating 3D human face models of the target object using the expression base corresponding to the target object and the expression sequence corresponding to the speech information; and displaying the 3D human face models in turn according to a sequence of the at least one expression in the expression sequence in a process of playing the speech information.

18. A non-transitory computer-readable storage medium, storing at least one program, the at least one program being loaded and executed by a processor of a computer device to perform a plurality of operations including:

obtaining n sets of image pairs of a target object in n types of head postures, the n sets of image pairs comprising color feature images and depth images in the n types of head postures, an $i^{th}$ head posture being corresponding to an $i^{th}$ set of image pair, n being a positive integer, 0<i≤n;

constructing a 3D human face model of the target object according to the n sets of image pairs;

generating an expression base corresponding to the target object based on the 3D human face model;

extracting a texture map of the target object from the color feature images of the n sets of image pairs; and generating a 3D human face model with texture of the target object according to the expression base and the texture map.

19. The non-transitory computer-readable storage medium according to claim 18, wherein the obtaining n sets of image pairs of a target object in n types of head postures comprises:

obtaining candidate image pairs of the target object;

sifting, from the candidate image pairs and according to a quality requirement, target image pairs meeting the quality requirement; and selecting the image pairs corresponding to the n types of head postures from the target image pairs.

20. The non-transitory computer-readable storage medium according to claim 18, wherein the plurality of operations further comprise:

determining an expression sequence corresponding to speech information to be played, the expression sequence comprising at least one expression;

generating 3D human face models of the target object using the expression base corresponding to the target object and the expression sequence corresponding to the speech information; and displaying the 3D human face models in turn according to a sequence of the at least one expression in the expression sequence in a process of playing the speech information.

* * * * *